(No Model.)
T. A. EDISON.
SYSTEM OF ELECTRICAL DISTRIBUTION.
No. 369,442. Patented Sept. 6, 1887.
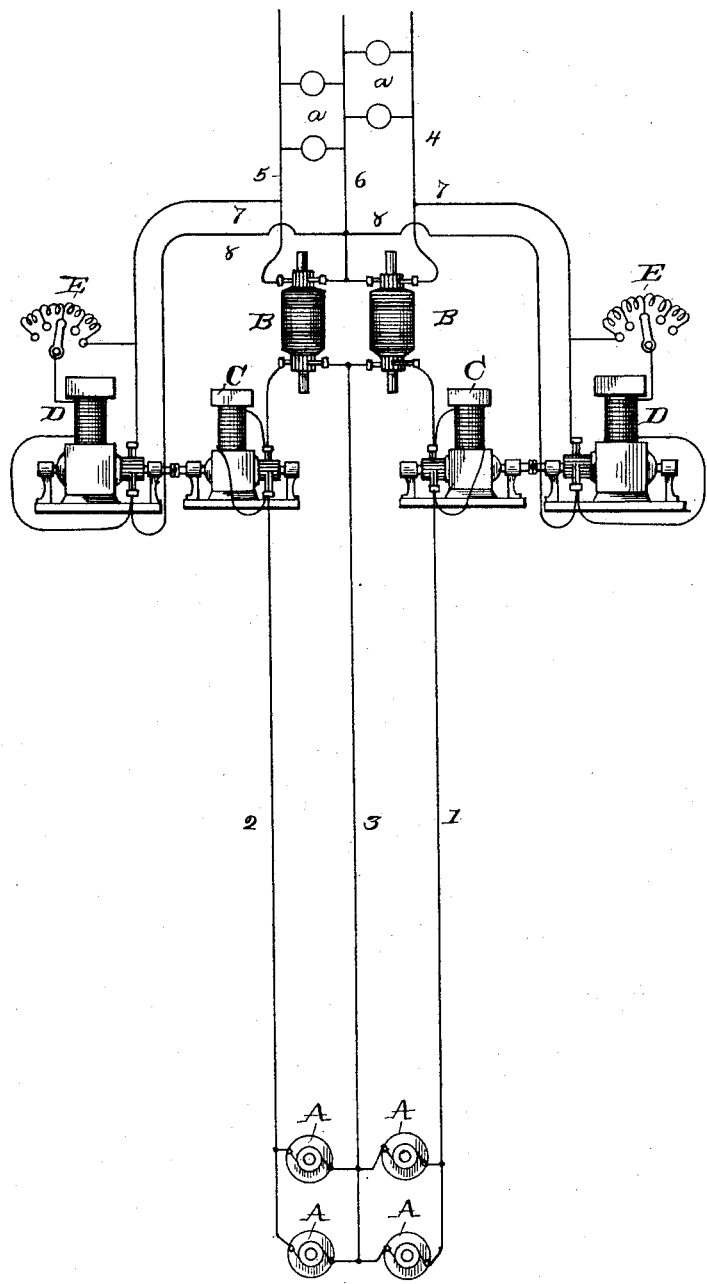
ATTEST:
INVENTOR:

UNITED STATES PATENT OFFICE.

THOMAS A. EDISON, OF LLEWELLYN PARK, NEW JERSEY.

SYSTEM OF ELECTRICAL DISTRIBUTION.

SPECIFICATION forming part of Letters Patent No. 369,442, dated September 6, 1887.

Application filed December 22, 1886. Serial No. 222,271. (No model.)

*To all whom it may concern:*

Be it known that I, THOMAS A. EDISON, of Llewellyn Park, in the county of Essex and State of New Jersey, have invented a certain new and useful Improvement in Systems of Electrical Distribution, (Case No. 709,) of which the following is a specification.

My invention relates to that class of systems of electrical distribution in which a source of electricity of high tension is employed, from which the high-tension current is conveyed by small conductors to a sub-station, where by means of suitable induction apparatus or devices the high-tension current is converted into a low-tension current suitable for use in electric lighting or for other domestic or business purposes, such current being distributed from the sub-station to the electric lamps, electric motors, or other translating devices in the district supplied.

The object of my invention is to regulate at the sub-station the electro-motive force on the high-tension line, a constant electro-motive force being maintained at the main station. I accomplish this by placing in the high-tension circuit at the sub-station a suitable current-varying device, the regulation or adjustment of which varies the condition of the high-tension circuit.

The accompanying drawing is a diagram of a three-wire system embodying the preferred form of my invention.

A A represent dynamo-electric machines generating currents of high tension, situated at the main station at a place where power is economically available. They are shown as arranged to form the divided source of electricity of a three-wire or compensating system. From the terminals of the generators a three-wire circuit, 1 3 2, extends, conveying the high-tension current to the sub-station, which is situated within or near the district to be supplied with current.

At the sub-station are placed double-wound rotating converters B B, which receive the high-tension current at one commutator and discharge at another current of the desired comparatively low tension. The two converters, as shown, are placed in series as a divided source, and the three-wire low-tension circuit 4 6 5 extends from such source, supplying translating devices *a a* in multiple series.

In each side of the high-tension line at the sub-station is connected an electro-dynamic motor, C. These motors are so wound that at a normal speed—say at one-half their full speed—they throw a low or minimum counter electro-motive force into the high-tension circuit. The fields of these motors may be energized in any suitable manner. As shown, they are energized from the high-tension circuit.

D D are motors run from the low-tension circuit 4 6 5 by circuits 7 8, and having adjustable resistances E E in their field-circuits, whereby their speed is regulated. Each of these motors has its armature-shaft connected, either directly, as shown, or through suitable belts or gearing, with the armature-shaft of one of the motors C C.

The operation is as follows: Suppose the main source to have a constant pressure of two thousand five hundred volts and the motors C to give each a back-pressure of five hundred volts. The effective pressure will then be two thousand volts; but if an increased load on the converters causes a decrease in this pressure, and it is desired to bring the pressure up again, the fields of the motors D are strengthened by throwing out more resistance, and the speed of such motors, and consequently of motors C, is decreased, whereby the counter electro-motive force of motors C is reduced and the pressure on the high-tension circuit is brought up to the desired two thousand volts again. If the load on the converters decreases so that the pressure must be reduced to bring it to the constant, the fields of motors D are weakened and the counter electro-motive force of motors C is reduced again.

Either side of the three-wire circuit may be regulated separately, as will be readily seen, as the relative number of translating devices on the two sides varies. My invention, however, is not confined to the three-wire system; but may be as readily used with a two-wire system of distribution.

What I claim is—

1. In a system of electrical distribution, the combination of a source of electricity of high tension, a circuit extending therefrom to a sub-station, a tension-reducing converter at said sub-station, a circuit extending therefrom to translating devices, an electro-dynamic motor in the high-tension circuit at the sub-station, and means for varying the counter electro-motive force of said motor, substantially as set forth.

2. In a system of electrical distribution, the combination of a source of electricity of high tension, a circuit extending therefrom to a sub-station, a tension-reducing converter at said sub-station, a circuit extending therefrom to translating devices, an electro-dynamic motor in the high-tension circuit, a motor connected mechanically therewith, and means for varying the speed of the second motor, substantially as set forth.

3. In a system of electrical distribution, the combination of a source of electricity of high tension, a circuit extending therefrom to a sub-station, a tension-reducing converter at said sub-station, a circuit extending therefrom to translating devices, an electro-dynamic motor in the high-tension circuit and another in the low-tension circuit at the sub-station, having a mechanical connection between their armatures, and means for regulating the strength of the field-magnet of the low-tension current-motor, substantially as set forth.

4. In a system of electrical distribution, the combination of a divided source of electricity of high tension, a three-wire circuit extending therefrom to a sub-station, tension-reducing converters in series at the sub-station, a three-wire circuit extending therefrom, and a current-varying device in each side of the high-tension circuit at the sub-station, substantially as set forth.

5. In a system of electrical distribution, the combination of a divided source of electricity of high tension, a three-wire circuit extending therefrom to a sub-station, tension-reducing converters at the sub-station in series, a three-wire circuit extending therefrom to translating devices, an electro-dynamic motor in each side of the three-wire circuit at the sub-station, and means for regulating the speed of said motors, substantially as set forth.

This specification signed and witnessed this 16th day of December, 1886.

THOS. A. EDISON.

Witnesses:
WM. PEZER,
E. C. ROWLAND.